US009131750B2

(12) United States Patent
Takahashi (10) Patent No.: US 9,131,750 B2
(45) Date of Patent: Sep. 15, 2015

(54) CORD FASTENER

(75) Inventor: Yoshinobu Takahashi, Toyama (JP)

(73) Assignee: YKK Corporation (JP)

( * ) Notice: Subject to any disclaimer, the term of this patent is extended or adjusted under 35 U.S.C. 154(b) by 176 days.

(21) Appl. No.: 13/511,080

(22) PCT Filed: Nov. 30, 2009

(86) PCT No.: PCT/JP2009/070109
§ 371 (c)(1),
(2), (4) Date: May 21, 2012

(87) PCT Pub. No.: WO2011/064885
PCT Pub. Date: Jun. 3, 2011

(65) Prior Publication Data
US 2012/0279022 A1 Nov. 8, 2012

(51) Int. Cl.
F16G 11/00 (2006.01)
A43C 7/08 (2006.01)
F16G 11/10 (2006.01)

(52) U.S. Cl.
CPC ................ *A43C 7/08* (2013.01); *F16G 11/103* (2013.01); *Y10T 24/3969* (2015.01); *Y10T 24/3973* (2015.01)

(58) Field of Classification Search
CPC ......... F16G 11/10; F16G 11/04; F16G 11/14; F16G 11/103; A43C 7/00; A43C 7/08; Y10T 24/3936; Y10T 24/3973; Y10T 24/3971; Y10T 24/47
USPC ........ 24/136 R, 136 L, 115 H, 115 K, 115 M, 24/115 R, 712.5
See application file for complete search history.

(56) References Cited

U.S. PATENT DOCUMENTS 1,454,437 A * 5/1923 Geils ............................ 403/233
2,032,567 A * 3/1936 Fiege ........................... 24/115 R
(Continued)

FOREIGN PATENT DOCUMENTS

CN 1143170 A 2/1997
CN 1903095 A 1/2007
(Continued)

OTHER PUBLICATIONS

International Search Report and Written Opinion, PCT International Application No. PCT/JP2009/070109, mailed Mar. 2, 2010.
(Continued)

*Primary Examiner* — Robert J Sandy
(74) *Attorney, Agent, or Firm* — Kilpatrick Townsend & Stockton LLP (57) ABSTRACT

A string stopper temporarily fixing a string with enhanced firmness while having improved handleability is provided. A string stopper includes a body accommodating plural string ends, the body including a substantially cylindrical socket and a plug insertable in the socket, the socket including a string opening, a plug opening, an accommodating portion accommodating a predetermined length of the string ends, and plural securing portions securing the string ends in the accommodating portion, the plug including a base closing the plug opening, a leg integrally extending from the base and insertable in the accommodating portion and a temporarily fixing portion temporarily fixing the string ends and including first projection and second projection laterally projecting from the leg. The first projection includes two or more first projections arranged along the extending direction of the leg. The second projection faces a space between the first projections.

2 Claims, 8 Drawing Sheets

(56) References Cited

U.S. PATENT DOCUMENTS

| | | | | |
|---|---|---|---|---|
| 2,573,806 A | * | 11/1951 | Paterson | 403/216 |
| 3,897,161 A | * | 7/1975 | Reinwall, Jr. | 403/211 |
| 3,965,544 A | * | 6/1976 | Boden | 24/136 R |
| 4,102,019 A | * | 7/1978 | Boden | 24/712.5 |
| 4,156,574 A | * | 5/1979 | Boden | 403/211 |
| 4,455,717 A | * | 6/1984 | Gray | 24/115 R |
| 4,719,671 A | * | 1/1988 | Ito et al. | 24/115 R |
| 4,807,333 A | * | 2/1989 | Boden | 24/712.5 |
| 4,895,402 A | * | 1/1990 | Tomita | 292/307 R |
| 5,454,140 A | * | 10/1995 | Murai | 24/136 R |
| 5,671,508 A | | 9/1997 | Murai | |
| 5,689,860 A | * | 11/1997 | Matoba et al. | 24/115 F |
| 5,903,959 A | * | 5/1999 | Leonardi | 24/712.1 |
| 6,185,798 B1 | * | 2/2001 | Ton | 24/712.1 |
| 6,339,865 B1 | * | 1/2002 | Takahashi et al. | 24/136 R |
| 6,457,214 B1 | * | 10/2002 | Boden | 24/136 R |
| 7,140,078 B2 | * | 11/2006 | Watabe | 24/115 G |
| D551,066 S | * | 9/2007 | Takahashi | D8/383 |
| 7,346,963 B2 | * | 3/2008 | Takahashi | 24/136 R |
| 7,574,779 B2 | * | 8/2009 | Takahashi | 24/136 L |
| 2007/0022575 A1 | | 2/2007 | Takahashi | |

FOREIGN PATENT DOCUMENTS

| | | |
|---|---|---|
| DE | 102006034367 A | 2/2007 |
| JP | 03-002942 | 1/1991 |
| JP | 2005-296178 A | 10/2005 |
| JP | 2007-29343 A | 2/2007 |
| JP | 2007-167199 A | 7/2007 |
| KR | 10-2007-0014032 A | 1/2007 |

OTHER PUBLICATIONS

Office Action, Chinese Patent Application No. 200980162652.2, mailed Apr. 2, 2014.

* cited by examiner

CORD FASTENER

This application is a national stage application of PCT/JP2009/070109 which is incorporated herein by reference.

TECHNICAL FIELD

The present invention relates to a string stopper to be attached to a string end.

BACKGROUND ART

Strings are generally used for various purposes. Specifically, strings are widely used, for example, for closing an opening in shoes, bags, garments and personal ornaments or for adjusting a size thereof. Strings are also used in a variety of different circumstances such as in connecting items to each other or fixing cargos.

It should be noted that the word "strings" herein refers to general string-like bodies that can be tied and includes not only a typical string, wire and cable but also a tape, belt and the like.

Such strings are usually end-treated. If a string end is left without any treatment after being cut off, the cross section of the string end will not be pleasing to the eye or to the touch. Further, if the string is made by weaving, the string end may be frayed. One simple end-treatment is knotting the end. A dedicated string stopper is also used for better handleability and decorativeness.

There has been developed a string stopper that covers a string end (a region of a predetermined length from an end of the string) to eliminate a trouble of making a knot of the string.

Specifically, a string end is inserted into a substantially cylindrical female part, and then held by a leg of a male part inserted into the female part from the opposite side (see Patent Literature 1).

In the string stopper of Patent Literature 1, rows of spike-like projections configured to bite into the string are formed on lateral surfaces of the leg. Additionally, a pair of holding plates are formed such that the rows of spike-like projections are sandwiched between the holding plates. In order to attach this string stopper to the string end, the string end is initially inserted into the female part through an opening of the female part on one side, and pulled out from an opening of the female part on the opposite side. The string end is then held by the pair of holding plates. At this stage, the spike-like projections do not bite into the string but simply face it. Subsequently, while the string is pulled out from the one opening, the leg and the string end are gradually introduced into the female part through the opposite opening. When the string end and the leg are completely accommodated in the female part, the string is held between the spike-like projections and an inner side of the female part for fixation.

CITATION LIST

Patent Literature(s)

Patent Literature 1: JP-A-2005-296178

SUMMARY OF THE INVENTION

Problems to be Solved by the Invention

In order to attach the string stopper of Patent Literature 1, while the string is pulled out from the opening of the female part on the one side, the string end and the leg need to be simultaneously introduced into the female part through the opposite opening of the female part. For the introduction of the string end and the leg, the string is held by the pair of holding plates, thereby achieving the unity of the string and the leg. With such a temporary fixation, handleability is significantly improved.

However, since the pair of holding plates of Patent Literature 1 are provided by opposed plates each having a predetermined length in a continuous direction of the string, it is troublesome to fit the string between the plates.

Further, in order to allow the pair of holding plates of Patent Literature 1 to exhibit more stable holding force, it is necessary to extend the lengths of the plates in the continuous direction of the string or to narrow the interval between the pair of plates, either of which will make it difficult to fit the string.

It is thus difficult to enhance the firmness of temporary fixation of the string while improving handleability.

An object of the invention is to provide a string stopper capable of temporarily fixing a string with enhanced firmness while having improved handleability.

Means for Solving the Problems

According to an aspect of the invention, a string stopper includes a body being configured to accommodate a plurality of string ends, in which the body includes: a substantially cylindrical socket; and a plug being configured to be inserted in the socket, the socket includes: a string opening through which the string ends are inserted; a plug opening through which the plug is inserted; an accommodating portion being in communication with the string opening and the plug opening, the accommodating portion being configured to accommodate a predetermined length of the string ends inserted through the string opening; and a plurality of securing portions being configured to secure the string ends accommodated in the accommodating portion, the plug includes: a base being configured to close the plug opening of the socket; a leg being integrally formed to extend from the base, the leg being configured to be inserted in the accommodating portion of the socket; and a temporarily fixing portion being configured to temporarily fix the string ends, and the temporarily fixing portion includes a first projection and a second projection laterally projecting from the leg, the first projection and the second projection projecting in an alternate manner in an extending direction of the leg.

According to the above arrangement, a dimension between the opposed surfaces of the first projection and the second projection is set smaller than the diameter of the string, so that each of the string ends can be interposed and temporarily fixed between the first projection and the second projection. The first projection and the second projection are not squarely opposed to each other, but are positionally shifted from each other in the extending direction of the leg. In other words, the first projection and the second projection are arranged in a so-called zigzag manner to define a zigzag space. By setting the string in the zigzag space, the string can be easily held as compared with in the typical arrangement in which the string is fitted between the pair of plate materials.

In the aspect, it is preferable that the first projection includes two or more first projections arranged along the extending direction of the leg, and the second projection is opposed to a space between the first projections.

According to the above arrangement, the first projection and the second projection, which may realize the above zigzag arrangement in the simplest manner, can be pressed against each of the string ends over a predetermined length in the extending direction of the leg, thereby ensuring a friction between the projections and the string end and thus temporarily fixing the string end with enhanced firmness.

In the above aspect, it is preferable that the plug further includes a plug-side string accommodating portion extending in the extending direction of the leg along each of lateral surfaces of the leg, the plug-side string accommodating portion being located between the first projection and the second projection.

According to the above arrangement, the space defined between the first projection and the second projection arranged in the above zigzag manner is used as the plug-side string accommodating portion. The string can be reliably accommodated in this plug-side string accommodating portion to be held.

In the above aspect, it is preferable that the first projection and the second projection are each provided by a plate-like projection formed along the extending direction of the leg.

According to the above arrangement, the first projection and the second projection can be pressed against each of the string ends over a predetermined length in the extending direction of the leg, thereby ensuring a friction between the projections and the string end and thus temporarily fixing the string end with enhanced firmness.

In the above aspect, it is preferable that string-opposed surfaces of the first projection and the second projection each have a sharpened edge of 90 degrees or less.

According to the above arrangement, the edges of the first projection and the second projection bite into each of the string ends set in a zigzag manner between the first projection and the second projection, so that the string end can be temporarily fixed with enhanced firmness.

In the above aspect, it is preferable that the first projection and the second projection are positionally different from each other in the extending direction of the leg.

According to the above arrangement, the first projection and the second projection are not parallel with each other within the same area defined in the extending direction of the leg, so that a large force is not necessary to fit each of the string ends between the first projection and the second projection. Further, since the first projection and the second projection do not mutually overlap in the extending direction of the leg, the plug can be manufactured from a synthetic resin by injection molding or the like without using a movable core or the like.

DESCRIPTION OF EMBODIMENT(S)

An exemplary embodiment of the invention will be described below with reference to the accompanying drawings.

Figure 1:
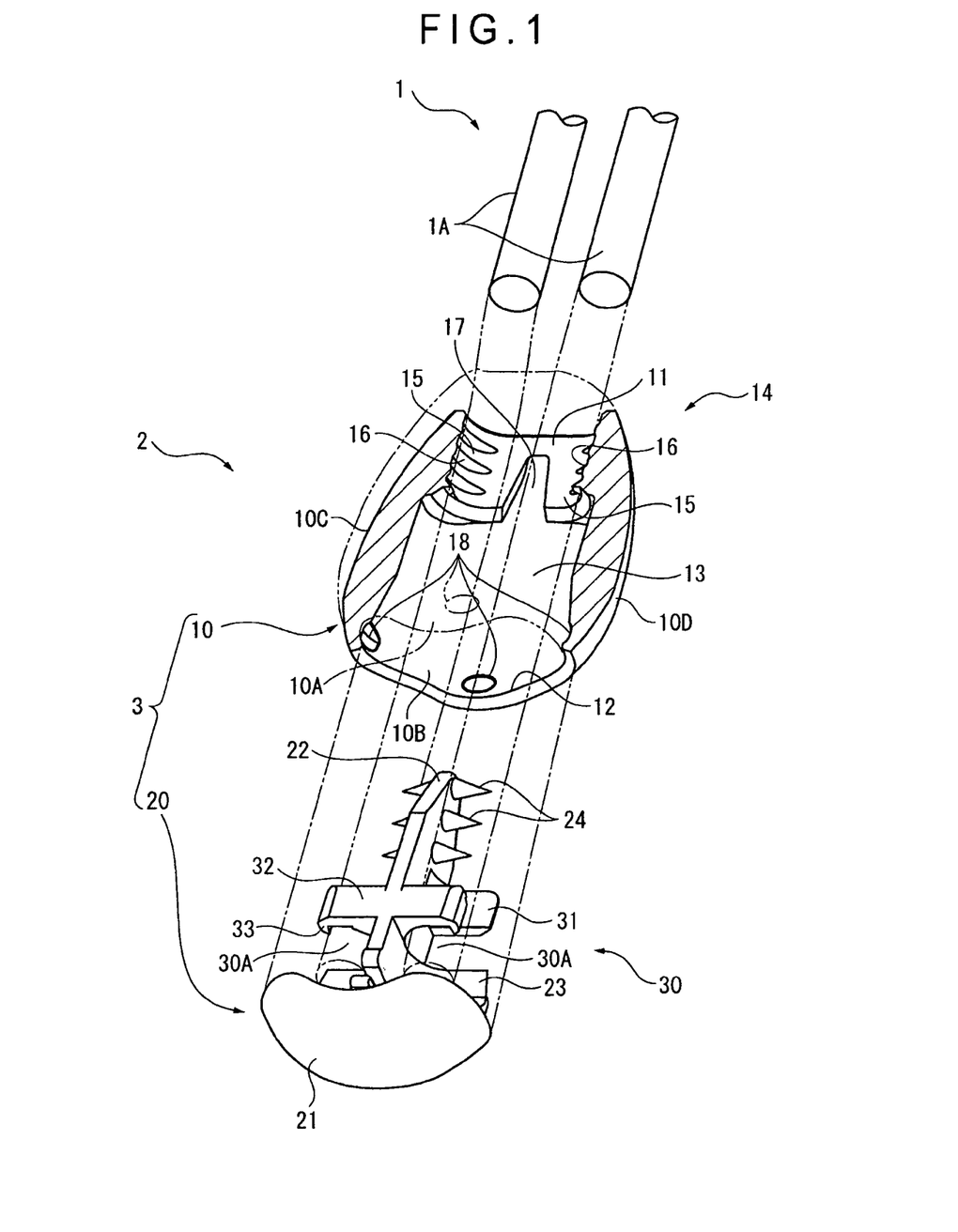
FIG. 1 is a partially cutaway exploded perspective view showing a socket and a plug according to an exemplary embodiment of the invention.

As shown in FIG. 1, a string stopper 2 according to the exemplary embodiment includes a body 3 in which two string ends 1A, such as both ends of a string 1 folded in a U-shape, are accommodated in parallel with each other.

For instance, the string 1 is, in use, threaded through a hole in a zipper slider and folded in two with the string ends 1A being inserted in the string stopper 2 (i.e., the string 1 is used as a finger grip for moving the zipper slider). Although the string 1 may have any cross-sectional shape (i.e. may be, for instance, a round or flat string) and may be made of any material, the invention can be more advantageous for a rubber string or the like having a great diameter reduction ratio.

The body 3 includes a cylindrical socket 10 and a plug 20 insertable in the socket 10 for engagement. Each of the socket 10 and the plug 20 is integrally formed of, for instance, a synthetic resin as an injection-molded article.

Referring to FIG. 1, the socket 10 includes a pair of flat main walls 10A and 10B opposed to each other with a space therebetween and curved lateral walls 10C and 10D connecting the lateral sides of the main walls 10A and 10B. One end of the cylindrical body is provided with a string opening 11 through which the string ends 1A are inserted while the other end is provided with a plug opening 12 through which the plug 20 is inserted.

The socket 10 defines an accommodating portion 13 therein. The accommodating portion 13 is in communication with the string opening 11 and the plug opening 12 and accommodates a predetermined length of the string ends 1A inserted through the string opening 11.

The accommodating portion 13 is formed to have substantially the same cross-sectional shape as the plug opening 12 (when cut in a direction intersecting an insertion direction of the plug 20) and to maintain substantially the same shape (i.e., a substantially flat oblong shape) along the insertion direction of the plug 20.

The lateral walls 10C and 10D are kept spaced from each other at substantially the same interval over a range from the plug opening 12 to the string opening 11 in the insertion direction of the plug 20.

An interval between sections of the main walls 10A and 10B in the vicinity of the plug opening 12 is gradually narrowed in the insertion direction of the plug 20, an interval between intermediate sections thereof are constant, and an interval between predetermined sections thereof in the vicinity of the string opening 11 is constant but narrower than the interval between the intermediate sections.

A section of the accommodating portion 13 in the vicinity of the string opening 11, which is narrower than an intermediate section of the accommodating portion 13, functions as a securing portion 14 with an elliptical cross section that secures the string ends 1A accommodated in the accommodating portion 13. The securing portion 14 has a cylindrical inner surface 15 defined along the lateral walls 10C and 10D. The curvature radius of the inner surface 15 is determined in accordance with the string 1.

The inner surface 15 is provided with a series of triangular undulations 16 at a portion defined along each of the lateral walls 10C and 10D, the undulations 16 being formed along a circumferential direction of the string ends 1A (i.e., in a direction intersecting a continuous direction of the string ends 1A).

When entering the securing portion 14, the string ends 1A are brought into close contact with the inner surface 15 to be pressed against the undulations 16, so that a pull-out resistance for the string ends 1A is increased (i.e., the string ends 1A are more firmly bitten).

The securing portion 14 is provided with guiding portions 17 formed in the middle of flat portions defined along the main walls 10A and 10B.

Each of the guiding portions 17 is provided by a groove formed in the securing portion 14. The guiding portions 17 are continuous with sections of the main walls 10A and 10B facing the intermediate section of the accommodating portion 13, and extend in the insertion direction of the plug 20. Each of the guiding portions 17 is tapered, so that the width of the guiding portion 17 is gradually narrowed in a direction in which the plug 20 is inserted into the socket 10 (i.e., a plug-insertion direction).

The socket 10 is provided with engagement-receiving portions 18 formed in the vicinity of the plug opening 12 of the socket 10 to maintain engagement between the socket 10 and the plug 20.

Specifically, four engagement-receiving portions 18 are formed on an inner surface of the socket 10 facing the accommodating portion 13 in such a manner that the four engagement-receiving portions 18 correspond to the main walls 10A and 10B and the lateral walls 10C and 10D, respectively. In the exemplary embodiment, the engagement-receiving portions 18 in the socket 10 are each formed as a hemispherical dent and engageable with projections correspondingly formed on the plug 20.

As shown in FIGS. 1, 2, 3 and 4, the plug 20 includes a base 21 configured to close the plug opening 12 of the socket 10, and a leg 22 integrally formed to extend from the base 21 and insertable in the accommodating portion 13 of the socket 10.

The base 21 has an outline that fits the plug opening 12 of the socket 10. That is, when seen in the plug-insertion direction, the base 21 has a substantially flat oblong shape with a substantially constant height.

The leg 22 includes a bulging portion 23 that bilaterally bulges from a base-end side of the leg 22. The bulging portion 23 is supported by a support 25 formed in the vicinity of both inner lateral ends of the base 21. With such a support structure, the leg 22 extends in the insertion direction of the plug 20 from a center of an inner side of the base 21.

The leg 22 is formed as a plate having a tapered tip end and having an upper surface, a lower surface and lateral surfaces. Additionally, the leg 22 has a sufficient length such that when the socket 10 and the plug 20 are in engagement with each other, the tip end of the leg 22 can reach the inside of the securing portion 14 of the socket 10 (see FIG. 7).

Figure 2:
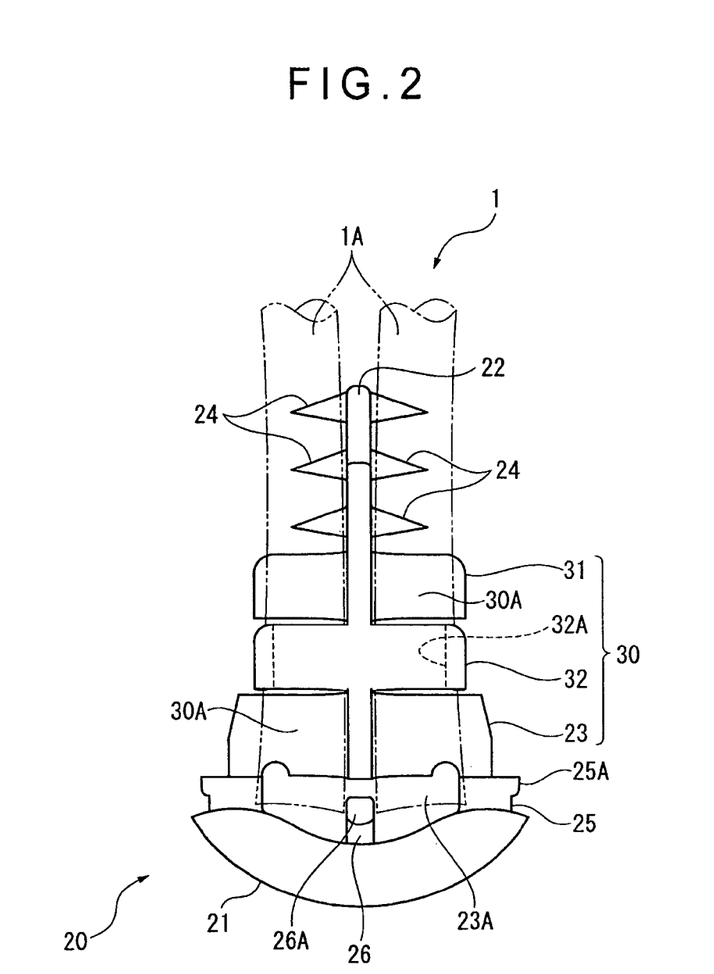
FIG. 2 is a plan view showing the plug according to the exemplary embodiment.
Figure 3:
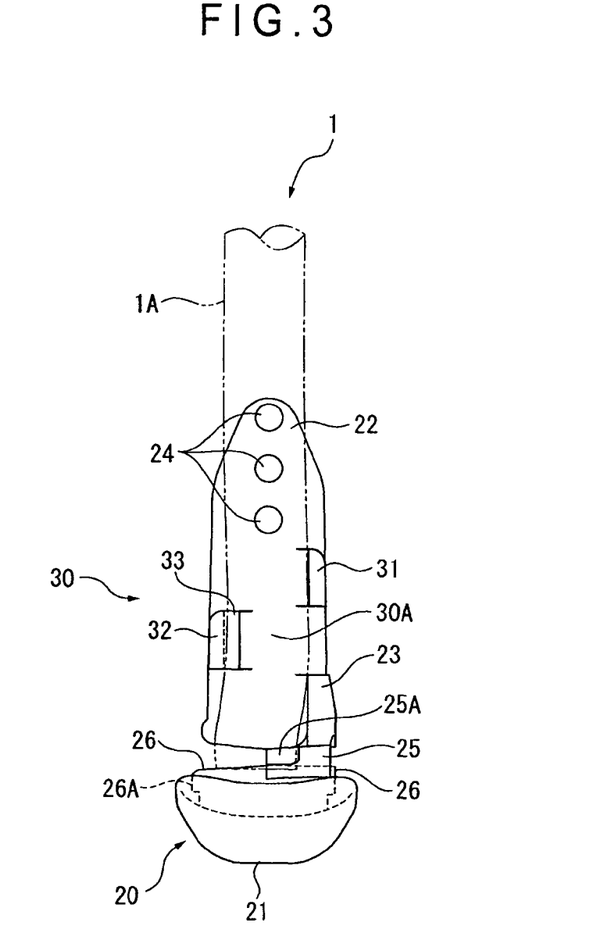
FIG. 3 is a side view showing the plug according to the exemplary embodiment.

As shown in FIGS. 2 and 3, engagement projections 25A are formed on lateral surfaces of the support 25, respectively. A space 23A is defined between the base 21 and the bulging portion 23. An elongated protrusion 26 is formed on the inner surface of the base 21 facing the space 23A. Engagement projections 26A are formed on both ends of the elongated protrusion 26.

When the socket 10 and the plug 20 are in engagement with each other, the engagement projections 25A are engaged with the engagement-receiving portions 18 of the socket 10 defined along the lateral walls 10C and 10D and the engagement projections 26A are engaged with the engagement-receiving portions 18 of the socket 10 defined along the main walls 10A and 10B. With such engagement, the plug 20 is prevented from being accidentally detached from the socket 10.

Figure 4:
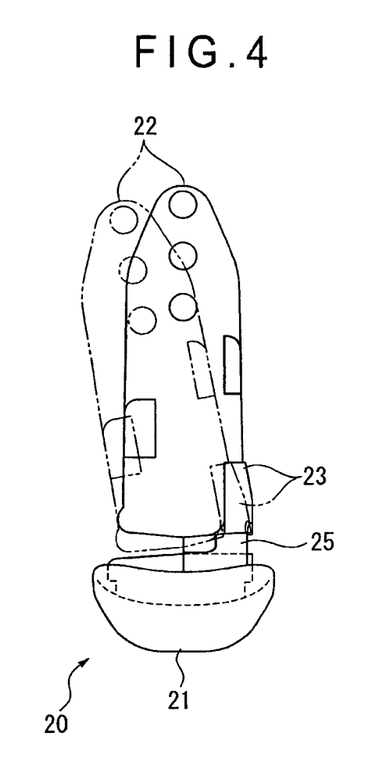
FIG. 4 is a side view showing deformation of the plug according to the exemplary embodiment.

The entirety of the plug 20 is integrally formed of a synthetic resin material having elasticity, so that the leg 22 can swing relative to the base 21 as shown in FIG. 4 due to deformation of the plug 20 between the bulging portion 23 and the support 25. Thus, the string ends 1A can be easily set at a predetermined position in the plug 20, thereby assembling the string stopper 2 with improved efficiency. Further, even if the leg 22 is deformed upon reception of a force from the string ends 1A or the like while the plug 20 is inserted in the socket 10, the base 21 will be reliably maintained in an appropriate orientation for closing the plug opening 12 of the socket 10 because the base 21 is swingable relative to the leg 22.

A plurality of securing projections 24 are arranged on each of both lateral sides near the tip end of the leg 22. The securing projections 24 are each formed as a cone having a sharpened tip end. When the plug 20 and the socket 10 are in engagement with each other, the securing projections 24 face the inner wall of the socket 10, i.e., the cylindrical inner surface of the securing portion 14, so that the tip ends of the securing projections 24 bite into the string ends 1A inserted between the cylindrical inner surface of the securing portion 14 and the securing projections 24 to reliably prevent the string ends 1A from accidental detachment.

A plurality of holding projections 31 and 32 are arranged on each of both lateral sides of the leg 22 at an intermediate section in an extending direction of the leg 22. On each lateral side of the leg 22, a plug-side string accommodating portion 30A in which each of the string ends 1A is to be accommodated is provided between the plurality of holding projections 31 and 32. The holding projection 31 is formed as a plate along one of the sides of the leg 22, i.e., along the lower surface of the leg 22, and has a surface located within the same imaginary plane as the bulging portion 23. The holding projection 32 is formed as a plate along the other side of the leg 22, i.e., along the upper surface of the leg 22, on the opposite side of the bulging portion 23 and the holding projection 31, and is located between the bulging portion 23 and the holding projection 31 in the extending direction of the leg 22 (i.e., the insertion direction of the plug 20). In other words, the holding projection 32, which projects along the upper surface of the leg 22, is opposed to a space between the bulging portion 23 and the holding projection 31, which project along the upper lower surface of the leg 22, with the plug-side string accommodating portion 30A being interposed therebetween (i.e., the holding projection 31, the holding projection 32 and the bulging portion 23 are arranged in a zigzag manner in the extending direction of the leg 22).

As shown in FIGS. 1 and 3, in combination with the lateral surface of the leg 22, respective opposed surfaces of the holding projections 31 and 32 and the bulging portion 23 define a cylindrical shape, the curvature of which is determined in accordance with the radius of the string ends 1A.

The holding projection 31 and the bulging portion 23 are spaced from the holding projection 32 at an interval slightly smaller than the diameter of the string ends 1A. Thus, the string end 1A can be held between the holding projection 31 and bulging portion 23 and the holding projection 32. Additionally, since the holding projection 31, the holding projection 32 and the bulging portion 23 are arranged in a zigzag manner as described above, the held string end 1A is curved in an S-shape therebetween. Thus, without receiving an excessive pressure, the string end 1A can be easily inserted and held between the holding projection 31 and bulging portion 23 and the holding projection 32.

The end of the holding projection 32 is provided with an elongated protrusion 33 for detachment prevention. The elongated protrusion 33 faces the plug-side string accommodating portion 30A and holds the string end 1A accommodated in the plug-side string accommodating portion 30A.

Respective edges of the holding projections 31 and 32 and the bulging portion 23 to be in contact with the string end 1A are each sharpened to 90 degrees or less. Thus, the held string end 1A can be prevented from accidental detachment.

The holding projections 31 and 32 and the bulging portion 23 in combination provide a temporarily fixing portion 30. The holding projection 31 and the bulging portion 23 located closer to the lower surface of the leg 22 than the plug-side string accommodating portion 30A function as a first projection. The holding projection 32 located closer to the upper surface of the leg 22 than the plug-side string accommodating portion 30A functions as a second projection.

In the exemplary embodiment, the bulging portion 23, which has the same effect as that of the holding projection 32, projects from the leg 22 to hold the string end 1A accommodated in the plug-side string accommodating portion 30A. However, the string end 1A accommodated in the plug-side string accommodating portion 30A may be held only by the holding projection.

In the exemplary embodiment, the holding projection 32 formed along the upper surface of the leg 22 and the holding projection 31 and the bulging portion 23 formed along the lower surface alternately project from the leg 22 such that the plug-side string accommodating portion 30A is interposed therebetween. Instead of the above arrangement of the exemplary embodiment, two upper projections and one lower projection may be provided, or, alternatively, two or more projections may be provided on each side.

In the exemplary embodiment, the string stopper is attached to the string ends as follows.

Figure 5:
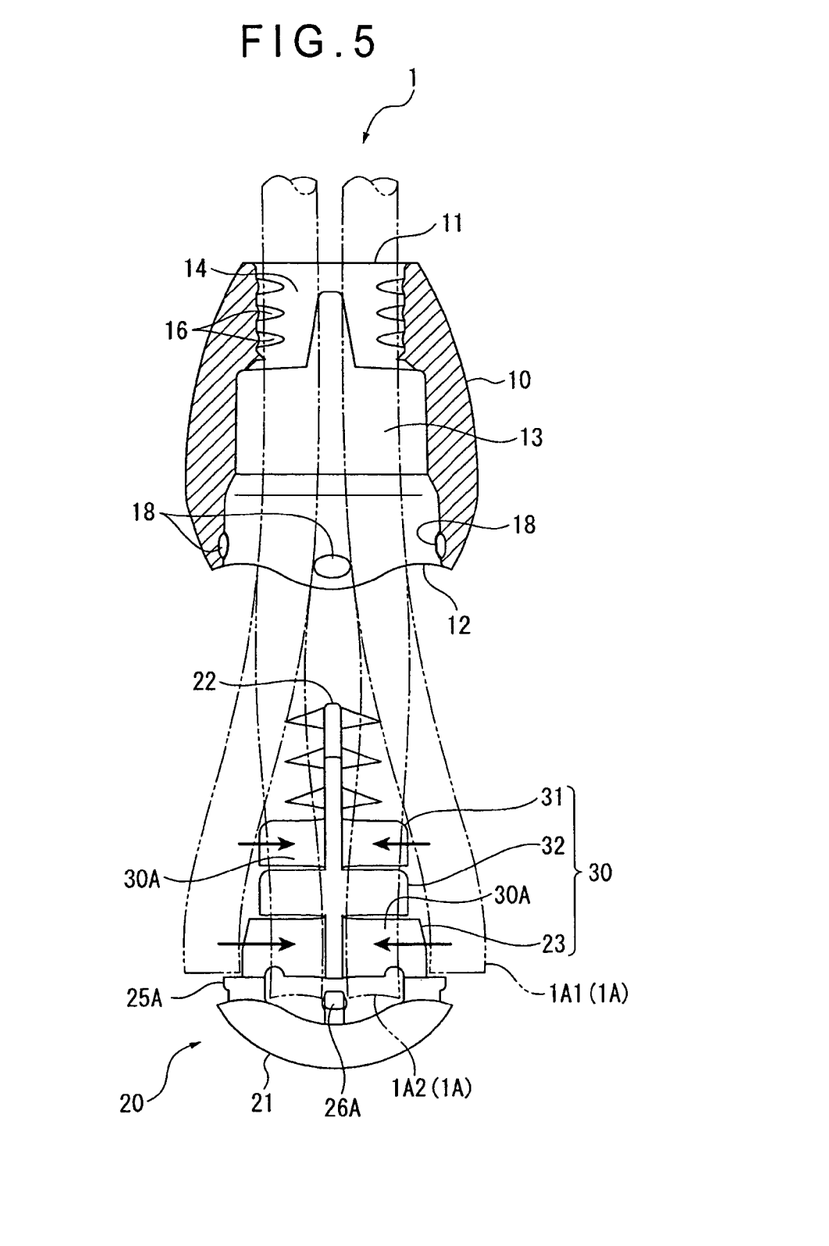
FIG. 5 shows the socket and the plug according to the exemplary embodiment before the plug is inserted into the socket.

As shown in FIG. 5, the two string ends 1A of the string 1 are inserted into the socket 10 through the string opening 11. The string ends 1A are pulled out of the plug opening 12 through the accommodating portion 13, and then temporarily fixed by the temporarily fixing portions 30 of the plug 20.

Specifically, each of the string ends 1A is set along the temporarily fixing portion 30 (see a string end 1A1 in FIG. 5), and then pushed from the lateral side into a space between the holding projection 31 and bulging portion 23 and the holding projection 32 of the plug 20 (see a string end 1A2 in FIG. 5). Simultaneously, the string end 1A is curved in an S-shape in accordance with the zigzag arrangement of the holding projections 31 and 32 and the bulging portion 23, so that the string end 1A can be temporarily fixed in a facilitated manner.

Figure 6:
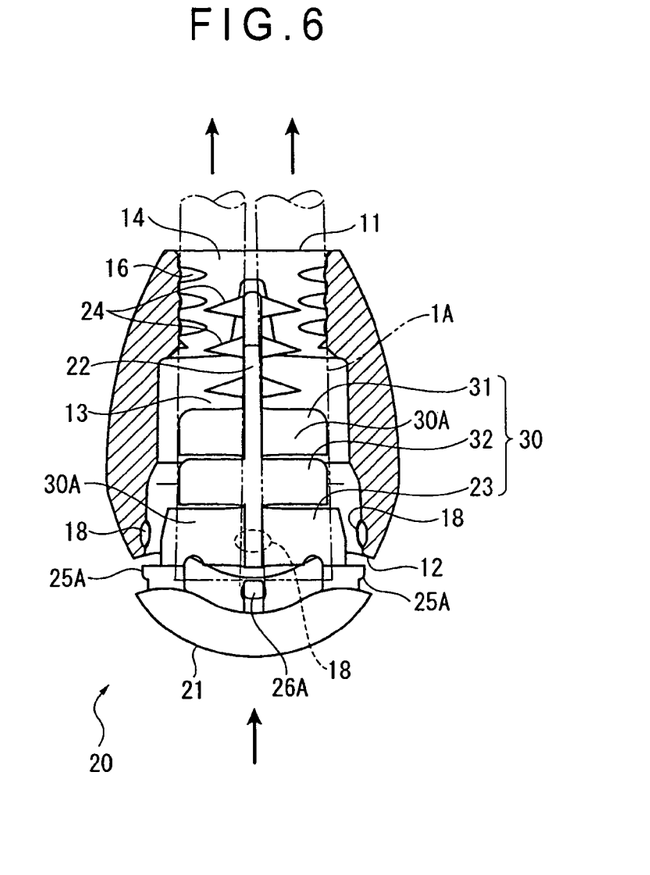
FIG. 6 shows the socket and the plug according to the exemplary embodiment just before the plug is engaged with the socket.

As shown in FIG. 6, when the string 1 is pulled out of the socket 10 while the base 21 is pushed toward the socket 10 with a finger, the plug 20 approaches the socket 10 and, eventually, the leg 22 is inserted into the socket 10. When the tip end of the leg 22 is in the socket 10, the string ends 1A are firmly pressed against the securing projections 24, so that the securing projections 24 bite into the string ends 1A. When the plug 20 is further pushed into the socket 10, the tip end of the leg 22 reaches the narrowed securing portion 14, so that the securing projection 24 further firmly bite into the string ends 1A to reliably prevent the detachment of the string ends 1A.

During the above series of operations, the tip ends of the string ends 1A and the vicinity thereof are fixed by the temporarily fixing portion 30, so that the operations can be facilitated.

When the plug 20 is sufficiently inserted into the socket 10 (i.e., when the plug 20 is completely inserted into the socket 10), the engagement projections 25A of the plug 20 are engaged with engagement-receiving portion 18 in the lateral walls 10C and 10D of the socket 10 and the engagement projections 26A are engaged with the engagement-receiving portions 18 in the main walls 10A and 10B of the socket 10, thereby preventing detachment of the plug 20 from the socket 10.

In the plug 20 of the exemplary embodiment, the opposed surfaces of the holding projection 31 and the bulging portion 23 (the first projection) are spaced from the opposed surface of the holding projection 32 (the second projection) at an interval substantially equal to or less than the diameter of the string ends 1A, so that each of the string ends 1A can be temporarily fixed between the first projection and the second projection. The first projection and the second projection are not squarely opposed to each other, but are positionally shifted from each other in the extending direction of the leg. In other words, the first projection and the second projection are arranged in a so-called zigzag manner to define a zigzag space. By setting the string in the zigzag space, the string can be easily held as compared with the typical arrangement in which the string is fitted between the pair of plate materials.

In the exemplary embodiment, since the holding projection 31 and the bulging portion 23 (the first projection) and the holding projection 32 (the second projection) of the plug 20 are each provided by a plate-like projection formed along the extending direction of the leg 22, the first projection and the second projection can be pressed against each of the string ends 1A over a predetermined length in the extending direction of the leg 22, thereby ensuring a friction between the projections and the string end 1A and thus temporarily fixing the string end 1A with enhanced firmness.

In the above exemplary embodiment, the opposed surfaces of the holding projection 31 and the bulging portion 23 (the first projection) and the opposed surface of the holding projection 32 (the second projection) of the plug 20 each have a sharpened edge of 90 degrees or less. When the edges of the first projection and the second projection bite into each of the string ends set in the zigzag space between the first projection and the second projection, the string end can be temporarily fixed with enhanced firmness.

In the plug 20 of the exemplary embodiment, the holding projection 31 and the bulging portion 23 (the first projection), the holding projection 32 (the second projection) and the securing projections 24 are positionally different from one another in the extending direction of the leg 22. Thus, the first projection and the second projection are not opposed to each other at any part thereof, so that a large force is not necessary for fitting each of the string ends 1A between the first projection and the second projection.

Further, since the first projection and the second projection are located not to mutually overlap in the extending direction of the leg 22 (i.e., the first projection and the second projection do not mutually overlap in a direction of image projection), the plug 20 can be manufactured from a synthetic resin by injection molding or the like without using a movable core or the like.

Figure 7:
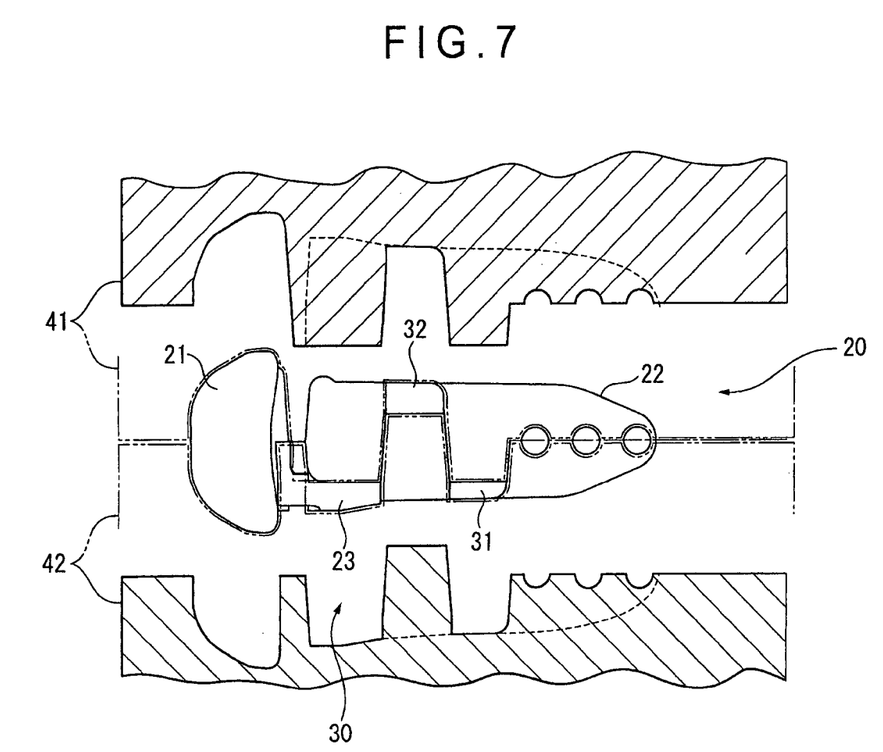
FIG. 7 is a side view showing a mold for the plug according to the exemplary embodiment.

Referring to FIG. 7, a pair of molds 41 and 42 may be used to form the plug 20. In the exemplary embodiment, the upper mold 41 is designed to form the upper surfaces of the holding projection 31 and the bulging portion 23 (the first projection) and the upper surface of the holding projection 32 (the second projection) of the plug 20 and the lower mold 42 is designed to form the lower surfaces thereof.

The plug 20 can be formed in the above manner because the holding projection 31 and the bulging portion 23 (the first projection), the holding projection 32 (the second projection) and the securing projections 24 are positionally different from one another in the extending direction of the leg 22 (i.e., they are arranged not to overlap one another). If these elements are in an overlapping arrangement, such simplified molds shown in FIG. 7 cannot be used for forming the plug 20 because of the possibility of occurrence of undercut.

In the exemplary embodiment, the securing projections 24 of the plug 20 are provided on the tip end of the leg 22 and the securing portion 14 of the socket 10 is located in the vicinity of the string opening 11, so that each of the string ends 1A can be moved through the wide accommodating portion 13 without being firmly bitten by the securing projections 24 until just before the plug 20 is completely inserted into the socket 10. Thus, the plug 20 can be smoothly inserted into the socket 10 and thus the string stopper 2 can be assembled in a smooth and facilitated manner.

Just before the plug 20 is completely inserted into the socket 10, each of the string ends 1A enters the narrow securing portion 14, in which the string end 1A is pressed and bitten by the securing projections 24. Thus, securing performance can be improved and the string end 1A can be reliably retained to be prevented from accidental detachment or the like.

The plug 20 includes the base 21 configured to close the plug opening 12 of the socket 10, and the leg 22 integrally formed to extend from the base 21 and insertable in the accommodating portion 13. The plug opening 12 of the socket 10 can be closed by the base 21 of the plug 20. Thus, dust can be prevented from entering the socket 10 while a good appearance can be obtained.

It should be appreciated that the scope of the invention is not limited to the exemplary embodiment, but includes various modifications and improvements as long as an object of the invention can be achieved.

Although the opposed surfaces of the holding projection 31 and the bulging portion 23 (the first projection) and the opposed surface of the holding projection 32 (the second surface) of the plug 20 each have a sharpened edge of 90 degrees or less in the exemplary embodiment, any one(s) or all of these edges may have an angle larger than 90 degrees. In such an arrangement, even when the edges bite into each of the string ends 1A, the firmness of the temporary fixation will be reduced, so that it is preferable that an additional arrangement is provided for compensating the reduction in firmness.

Although the holding projection 31 and the bulging portion 23 (the first projection) and the holding projection 32 (the second projection) of the plug 20 are each provided by a plate-like projection formed along the extending direction of the leg 22 in the exemplary embodiment, any one(s) or all of these projections may each have a cylindrical, columnar or any other shape In such an arrangement, since the first projection and the second projection cannot be pressed against each of the string ends 1A over a predetermined length in the extending direction of the leg 22, a friction between the projections and the string end 1A is lowered and thus the string end 1A is temporarily fixed with reduced firmness. Thus, it is preferable that an additional arrangement is provided for compensating the reduction in firmness.

Although the end of the holding projection 32 is provided with the elongated protrusion 33 for detachment prevention in the exemplary embodiment, the elongated protrusion 33 may be omitted. However, it should be noted that using the elongated protrusion 33 for detachment prevention can contribute to temporarily fixing each of the string ends with enhanced firmness. The end of the holding projection 31 or the bulging portion 23 may be provided with such an elongated protrusion for detachment prevention.

Although the leg 22 is connected to the base 21 via the support 25 and the bulging portion 23 in the exemplary embodiment, the leg 22 may be directly connected to the base 21. However, it should be noted that using the support 25 and the bulging portion 23 as in the exemplary embodiment can enable the leg 22 to be swingable.

Although the plug 20 is provided with the holding projection 31 and the bulging portion 23 (the first projection) and the holding projection 32 (the second projection) in the exemplary embodiment, arrangements for the first projection and the second projection may be different.

Figure 8:
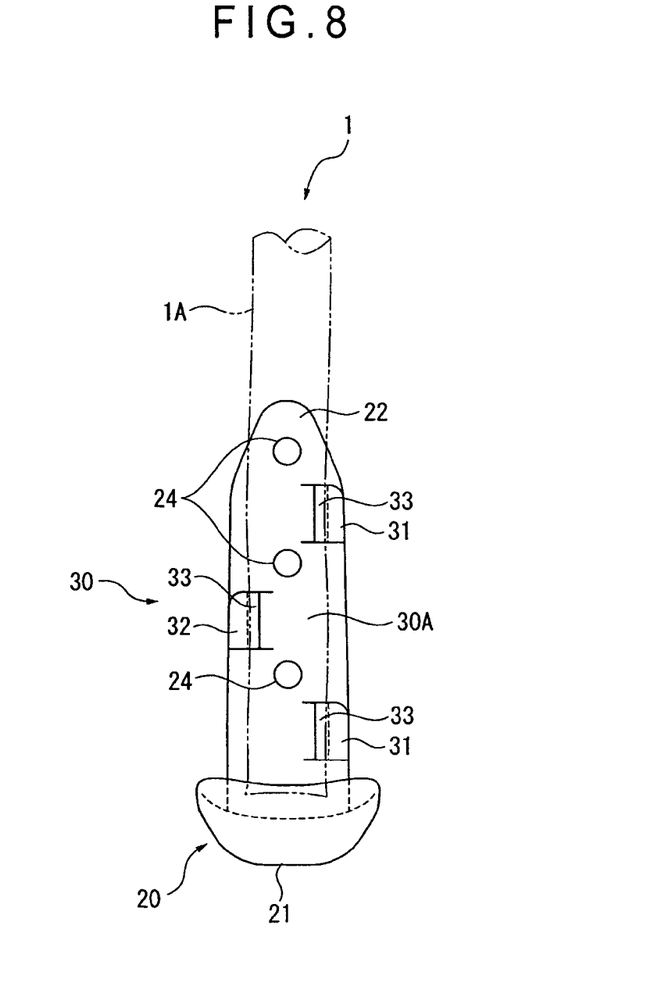
FIG. 8 is a side view showing another exemplary embodiment of the invention.

For instance, as in another exemplary embodiment shown in FIG. 8, an arrangement in which two of the holding projections 31, each having the elongated protrusion 33, are arranged and the holding projection 32 is opposed to a space therebetween may be employed.

In such an arrangement, the securing projections 24 may be located in the plug-side string accommodating portion 30A. Alternatively, the securing projections 24 may be located not only on the tip end portion of the leg 22 but also on the intermediate portion of each lateral surface of the leg 22.

Although the leg 22 is connected to the base 21 in a bendable manner via the support 25 or the like in the exemplary embodiment, the bulging portion 23 (the first projection), the support 25 and the elongated protrusion 26 according to the exemplary embodiment may be omitted and the leg 22 and the base 21 may be directly fixed to each other.

Although the string stopper 2 for end-treating the two string ends 1A is explained in the above exemplary embodiments, the string stopper may be used to end-treat three or more string ends (the string may be one or more). In such an arrangement, the shape of the securing portion 14 of the socket 10 and the number of the leg(s) 22 may be changed in accordance with the number of the string ends 1A.

In the above exemplary embodiments, an example in which the invention is applied to a string stopper for a string used to move a zipper slider is explained. However, the invention may also be applicable to an end-treating stopper for any other string.

The invention claimed is:

1. A string stopper comprising:
   a body being configured to accommodate a plurality of string ends, wherein the body comprises:
      a substantially cylindrical socket; and
      a plug being configured to be inserted in the socket, the plug integrally formed of an elastic synthetic resin material,
   the socket comprises:
      a string opening configured to receive the string ends;
      a plug opening configured to receive the plug;
      an accommodating portion being in communication with the string opening and the plug opening, the accommodating portion being configured to accommodate a predetermined length of the string ends inserted through the string opening; and
      a securing portion being configured to secure the string ends accommodated in the accommodating portion,
   the plug comprises:
      a base being configured to close the plug opening of the socket;
      a leg being integrally formed to extend from the base, the leg being configured to be inserted in the accommodating portion of the socket and formed as a plate having an upper surface, a lower surface and lateral surfaces;
      a support provided on the base, wherein a first portion of the support is provided on a first inner end of the base and a second portion of the support is provided on a second inner end of the base opposite the first portion; and a temporarily fixing portion being configured to temporarily fix the string ends, the temporarily fixing portion comprises a first projection and a second projection laterally projecting from the leg, the first projection and the second projection projecting in an alternate manner in an extending direction of the leg and being plate-like along the extending direction of the leg, the first projection projects from near a first edge of the lateral surfaces of the leg and comprises two or more projections arranged along the extending direction of the leg, the two or more projections having first opposed surfaces facing the second projection and being coplanarly located along the extending direction of the leg, the second projection projects from near a second edge of the lateral surfaces of the leg and is spaced apart from the two or more projections of the first projection in an opposing direction, the second projection having a second opposed surface opposed to a gap between the two or more projections of the first projection, a dimension between the first opposed surfaces and the second opposed surface is smaller than a diameter of the string ends, the first projection and the second projection are positionally different from each other in the extending direction of the leg, the plug comprises a plug-side string accommodating portion extending in the extending direction of the leg along each of the lateral surfaces of the leg, the plug-side string accommodating portion being located between the projections of the first projection and the second projection, a first end of one of the two or more projections of the first projection is supported directly on the first portion of the support and a second end of the one of the two or more projections is supported directly on the second portions of the support, the one of the two or more projections, the base, and the first and second portions of the support define a gap, and the plug is deformable between the one of the two or more projections and the base.

2. The string stopper according to claim 1, wherein the first opposed surfaces of the first projection and the second opposed surface of the second projection each have a sharpened edge of 90 degrees or less.

* * * * *

UNITED STATES PATENT AND TRADEMARK OFFICE
CERTIFICATE OF CORRECTION

PATENT NO. : 9,131,750 B2  
APPLICATION NO. : 13/511080  
DATED : September 15, 2015  
INVENTOR(S) : Takahashi Page 1 of 1

It is certified that error appears in the above-identified patent and that said Letters Patent is hereby corrected as shown below:

On the title page item (57) column 2, line 11, delete "portion" and insert -- portion, --, therefor.

In the specification

Column 6, line 44, before "lower" delete "upper".

Signed and Sealed this
Twenty-second Day of March, 2016

Michelle K. Lee
*Director of the United States Patent and Trademark Office*